(12) United States Patent
Olsson et al.

(10) Patent No.: US 6,437,539 B2
(45) Date of Patent: Aug. 20, 2002

(54) METHOD AND DEVICE FOR BALANCING CHARGES OF A PLURALITY OF SERIES-CONNECTED BATTERY CELLS

(75) Inventors: Dan Hakan Lennart Olsson, Voorhout; Geoffrey John Dudley, De Kaag, both of (NL)

(73) Assignee: Agence Spatiale Europeenne (FR)

( * ) Notice: Subject to any disclaimer, the term of this patent is extended or adjusted under 35 U.S.C. 154(b) by 0 days.

(21) Appl. No.: 09/794,967

(22) Filed: Feb. 27, 2001

(30) Foreign Application Priority Data

Mar. 1, 2000 (FR) .............................. 00 02645

(51) Int. Cl.[7] .................................. H01M 10/46
(52) U.S. Cl. ....................................... 320/118
(58) Field of Search ................. 320/116, 117, 320/118, 119, 120, 122

(56) References Cited

U.S. PATENT DOCUMENTS

| | | | |
|---|---|---|---|
| 5,773,159 A | | 6/1998 | Beard |
| 5,982,143 A | * | 11/1999 | Stuart ........................ 320/119 |
| 6,037,751 A | * | 3/2000 | Klang ........................ 320/160 |
| 6,150,795 A | * | 11/2000 | Kutkut et al. ............... 320/118 |
| 6,154,011 A | * | 11/2000 | Lam et al. ................... 320/139 |
| 6,291,972 B1 | * | 9/2001 | Zhang ........................ 320/118 |

FOREIGN PATENT DOCUMENTS

| | | |
|---|---|---|
| DE | 19708842 | 9/1998 |
| EP | 0 831 571 | 3/1998 |
| FR | 2 675 319 | 10/1992 |

* cited by examiner

*Primary Examiner*—Edward H. Tso
(74) *Attorney, Agent, or Firm*—Bachman & LaPointe, P.C.

(57) ABSTRACT

A method and device for balancing the charges of a plurality of series-connected battery cells, the device comprising a current dissipative loop connected across the terminals of each battery cell, the voltage across each battery cell being measured, the average value of the measured voltages being determined, the measured voltage being then compared to the average value, and the measured voltage of each battery cell being adjusted to the average value so as to equalize charges of all battery cells.

12 Claims, 3 Drawing Sheets

METHOD AND DEVICE FOR BALANCING CHARGES OF A PLURALITY OF SERIES-CONNECTED BATTERY CELLS

BACKGROUND OF THE INVENTION

1. Field of the Invention

The present invention relates to a method and a device for balancing the charges of a plurality of series-connected battery cells.

2. Description of the Prior Art

The devices known for balancing the charges of series connected battery cells are based either on a comparison of the individual voltage of each battery cell with an overcharge voltage, either upon actuation of an overcurrent relay, connecting the different battery cells together. These techniques are not adapted for lithium battery cells because current or voltage overcharge can cause the destruction of battery cells.

EP-0 767 524 (MOTOROLA) describes a method for balancing the charge distributed among two series connected cells. This method consists in comparing the currents through each of the cells and discharging the cell whose charging voltage is the highest when the difference between the detected currents is greater then a predetermined value. One drawback of this device that, on the one hand, currents can reach high values and damage the cells, and on the other hand, that the arrangement required for carrying out this comparison is complex.

SUMMARY OF THE INVENTION

It is an object of the present invention to provide a method and device for balancing the charges of series-connected battery cells while avoiding the destruction of such battery cells due to a voltage or current overcharge.

This object is achieved by a method wherein a current dissipative loop is connected across each battery cell, the voltage across each battery cell is measured, an average value of the measured voltages is determined, the measured voltage is compared to said average value, and for a given battery cell, the measured voltage is adjusted to said average value so as to equalize charges of all battery cells.

For this purpose, the dissipative loop is closed if the voltage measured across the relevant battery cell is greater than the average of the measured voltages, and said dissipative loop is opened if the voltage measured across said battery cell is lower than the average of the measured voltages.

The method according to this invention is carried out by a device comprising means for measuring the individual voltage of each battery cell, means for determining the average voltage of all series-connected battery cells and control means for equalizing the measured voltage with said determined average voltage.

Other features and advantages of the invention will become apparent from the following description of preferred embodiments of the present invention, provided by way of non-limiting examples, in reference to the appended Figures.

DETAILED DESCRIPTION OF THE PREFERRED EMBODIMENT

Figure 1:
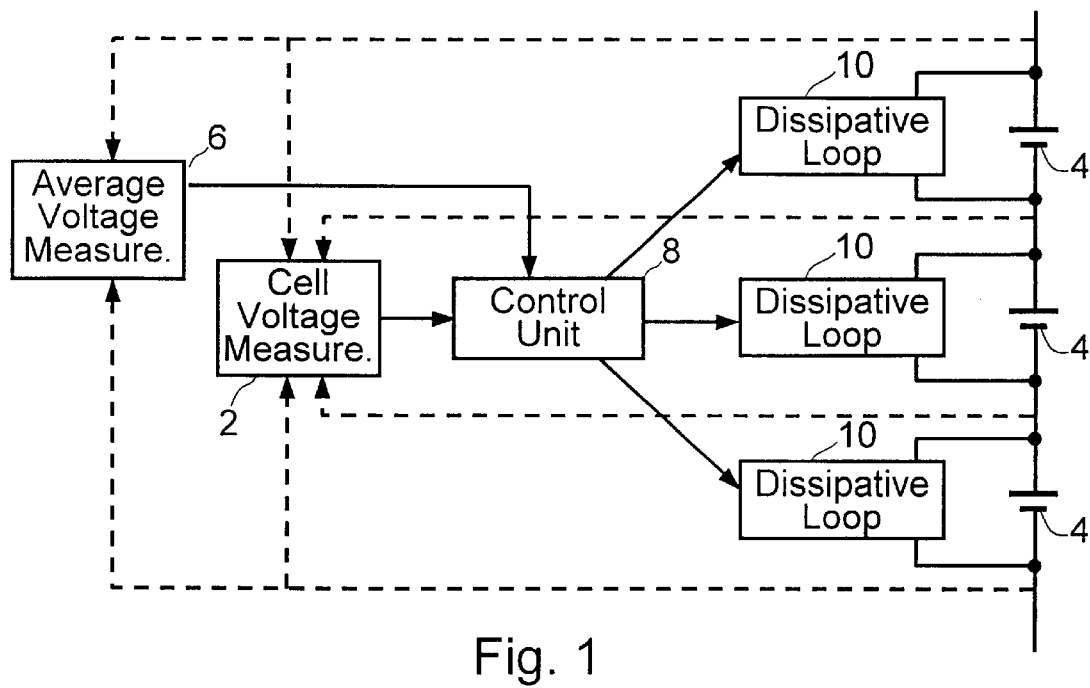
FIG. 1 schematically shows a block diagram of a device for carrying-out the method according to the present invention.

The device shown in FIG. 1 comprises a first means 2 for measuring the individual voltage of each battery cell 4, a second means 6 for determining the average voltage of all series-connected battery cells 4, and a control unit 8 for the equalization of the measured voltage with said determined average voltage.

Each battery cell 4 comprises a current dissipative loop 10, connected to said control unit 8, which causes either the opening of loop 10, if the individual voltage of battery cell 4 is lower than the average voltage, or the closing of said loop if the individual voltage of battery cell 4 is greater than the average voltage.

Figure 2:
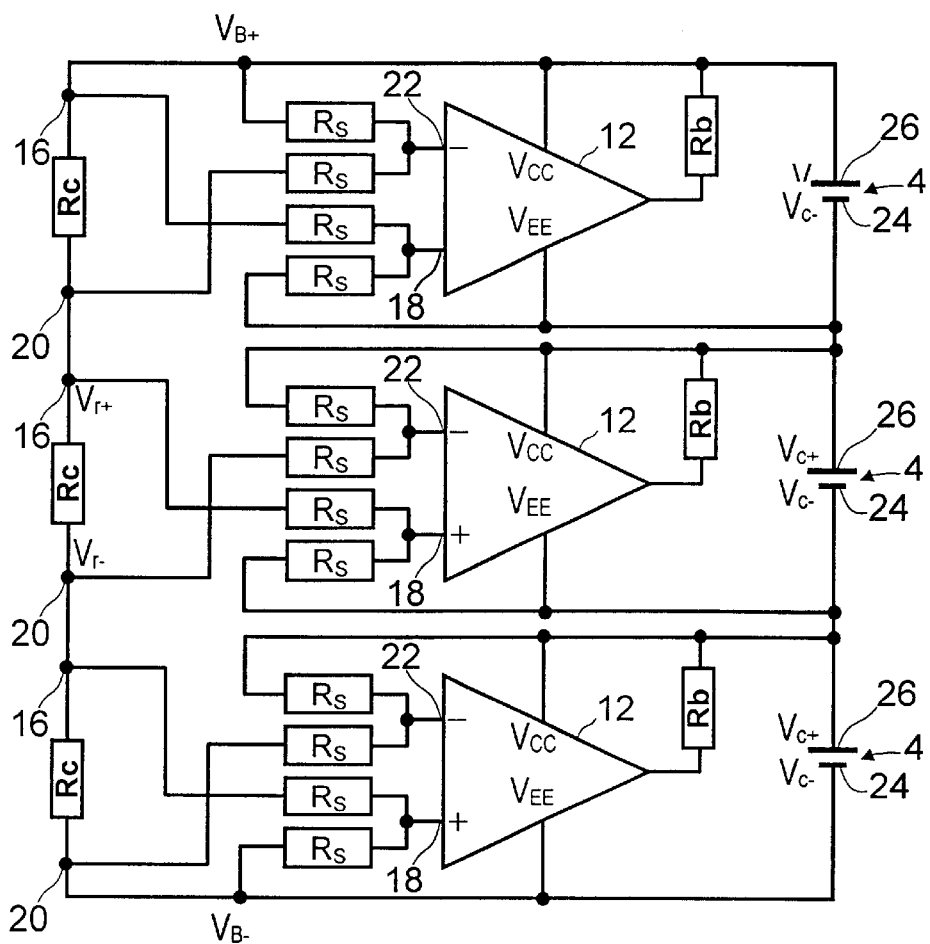
FIG. 2 schematically shows a first preferred embodiment of the device shown in FIG. 1

In a preferred embodiment of the present invention shown in FIG. 2, said dissipative loop 10 comprises a comparator 12 and a resistor Rc 14, a first terminal 16 of which, of electric potential $V_{r+}$, is connected to the positive terminal 18 of comparator 12 through a first resistor $R_S$, and a second terminal 20 of which, of electric potential $V_{r-}$, is connected to the negative terminal 22 of said comparator 12 via a second resistor $R_S$, which is identical to the first one, each of said positive 18 and negative 22 terminals of comparator 12 being additionally connected, respectively, to the negative terminal 24 and to the positive terminal 26 of battery cell 4 of electric potentials $V_{c-}$ and $V_{c+}$, respectively, via a third and a fourth resistors $R_S$, which are identical to the first one. The output of comparator 12 is connected to a dissipating resistor Rb. The dissipative loop 10 therefore comprises, in the drawing of FIG. 2, a resistor Rb, the comparator 12, which controls the opening and closing of the loop, and fourth resistor $R_S$.

With such a device, the dissipative loop 10 is controlled so as to be closed when the following condition is fulfilled:

$$V_c+V_{r-}>V_{r+}+V_{c-} \quad (1)$$

In an embodiment which is not shown, the operation of the device according to the present invention is improved by the addition of a positive feedback resistor connecting the output of the comparator 12 to the positive input 18 of said comparator. This causes a hysteresis that prevents oscillations when the voltages of battery cells are close to each other.

In another embodiment, the number of opening cycles of dissipative loop 10 can be substantially reduced by a slight modification in the input resistances $R_S$ of comparator 12 so as that the dissipative loop is closed when the individual voltage of a battery cell 4 exceeds the average voltage by a predefined value. This allows for small variations in the voltages of battery cell 4 without closing the dissipative loop 10 at the same time.

According to another embodiment, the value of both summing resistors at the input of comparator C can be slightly changed so as to derive from the cell current only when their charge exceeds the predetermined average value by a given value. This causes a reduction in the number of switching cycles and allows small variations in the cell voltages to be obtained without at the same time deriving therefrom.

Figure 3:
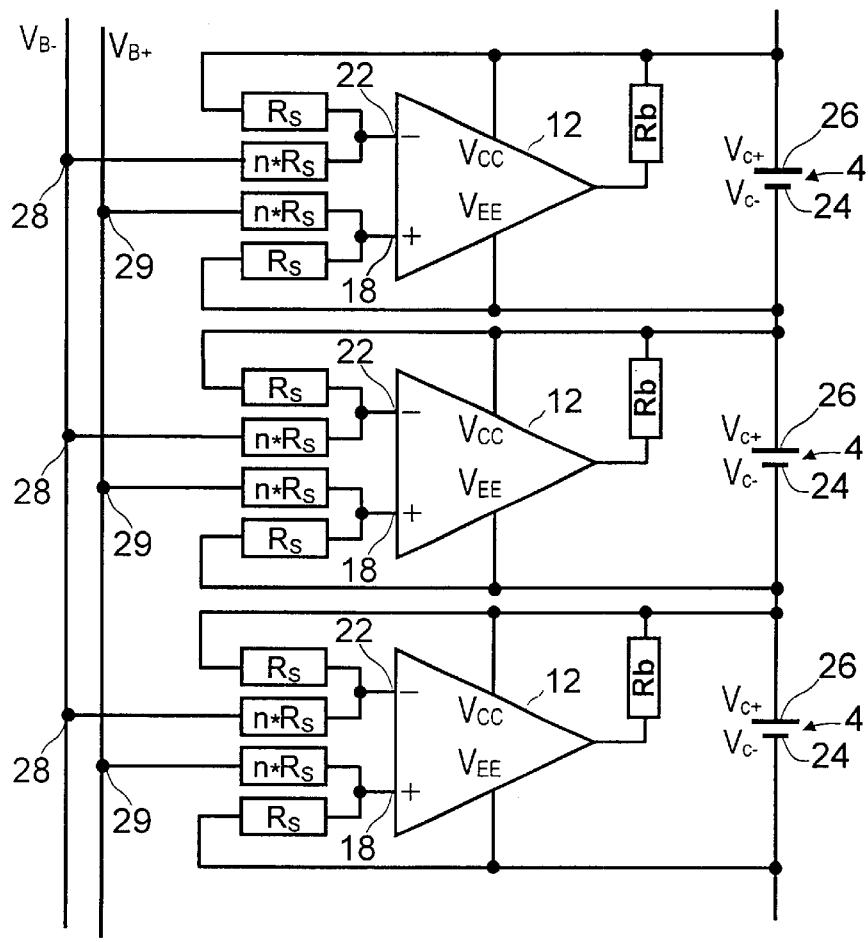
FIG. 3 schematically shows a second preferred embodiment of the device shown in FIG. 1.

According to yet another embodiment shown in FIG. 3, the resistor network Rc was eliminated from the circuit shown in FIG. 2, and resistors $R_S$ connecting the positive and negative inputs of comparator 12, respectively, to voltages $V_{r+}$ and $V_{r-}$ are replaced by resistors of value $n*R_S$, where n is the number of battery cells 4, and which are related to the battery voltages $V_{B+}$ and $V_{B-}$, respectively. Therefore, the voltage comparison which is thus carried-out by comparator 12 is equivalent to a voltage comparison performed by the corresponding cell with the average cell voltage (battery voltage/n).

By means of this arrangement, the input voltages of the comparator are always ranging between its supply voltages $V_{CC}$ and $V_{DE}$, whatever the imbalances between the respective charges of cells 4. The battery power which is dissipated within the resistor network Rc becomes zero. In addition, it is easier to adapt the circuit to the cell number when one of them is detected to be faulty and is disconnected. The latter feature is essential for space applications, since there are normally other devices in the battery which will permanently disconnect any cell detected as faulty.

In the case of the circuit shown in FIG. 2, resistor Rc corresponding to a faulty cell should be short-circuited, which requires the addition of n switching circuits, where n is the number of battery cells. On the contrary, in the circuit shown in FIG. 3, only one switch is necessary for the entire battery. In this respect, according to a first aspect shown in FIG. 4, each cell is associated with two additional resistors of resistance $(n-1)*R_S$, which are thus dimensioned for a battery comprising n–1 cells. Before cell failure, the first set of resistors $n*R_S$ is connected in parallel with the connection terminals of the battery. When detecting a cell failure, the first resistor set is disconnected, whereas the second resistor set $(n-1)*R_S$ is connected, by means of a switch 25.

In a specific embodiment of the present invention shown in FIG. 4, the output of comparator 12 is connected to the base of a pnp transistor T connected in parallel across the positive 26 and negative 24 terminals of each cell 4, the collector of transistor T being connected to terminal 24 of the cell through a resistor R1, which is series-connected to a Zener diode Z1 or to a potential barrier, so as to avoid cell discharging if its charge voltage has decreased below a predetermined voltage threshold. In this circuit, the dissipative loop comprises resistor R1, Zener diode Z1 and the collector-emitter junction of transistor T. Of course, Zener diode Z1 can be series-connected to other Zener diodes so that the redetermined voltage threshold can be achieved.

Transistor T is useful in the case where the output current of comparator 12 is insufficient for efficiently discharging the corresponding cell 4 when its voltage is greater than the average voltage of the battery cells.

Figure 5:
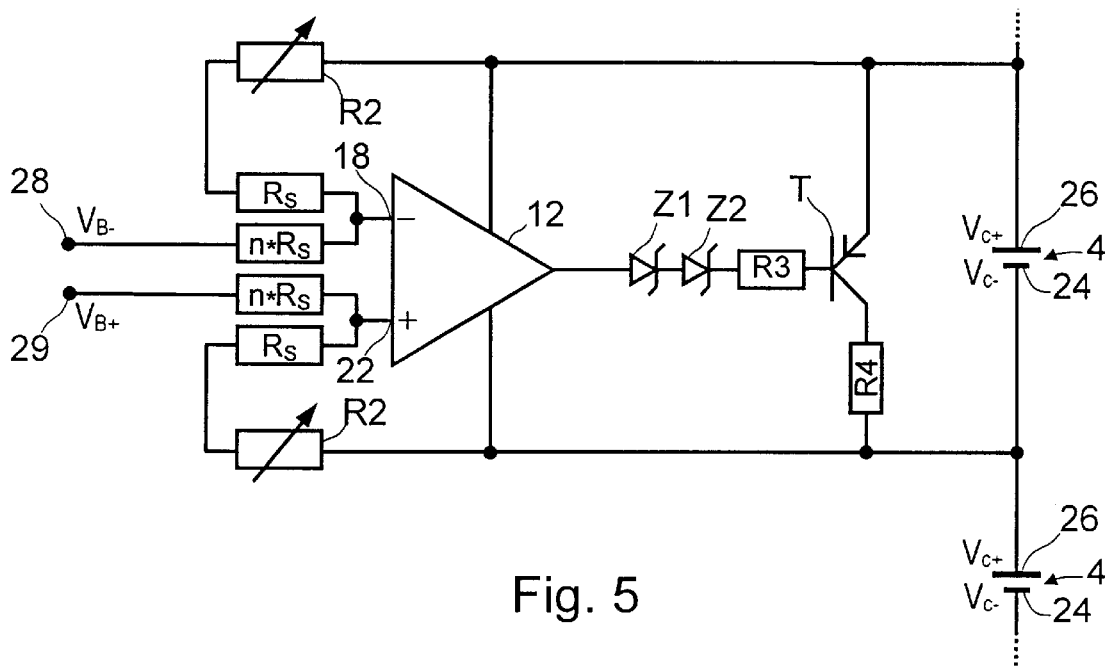
FIG. 5 shows another modification of the measurement and control circuit in one cell, according to the second specific embodiment shown in FIG. 3.

According to another preferred embodiment of the present invention, shown in FIG. 5, adjustable resistors R2 are series-connected with resistors Rs for adjusting the resistance of the latter. Moreover, in this embodiment, transistor T is controlled by the output of comparator 12, which is connected to two Zener diodes Z1, Z2, and a resistor R3, which are series-connected, resistor R3 being connected to the base of transistor T. In this circuit, the dissipative loop comprises the collector-emitter junction of transistor T and a resistor R4, which is connected between the emitter of transistor T and terminal 24 of the corresponding cell 4. Zener diodes Z1 and Z2 allow the threshold voltage at which the collector-emitter junction of transistor T is turned on, and therefore below which cell 4 is not discharged, to be increased.

Figure 6:
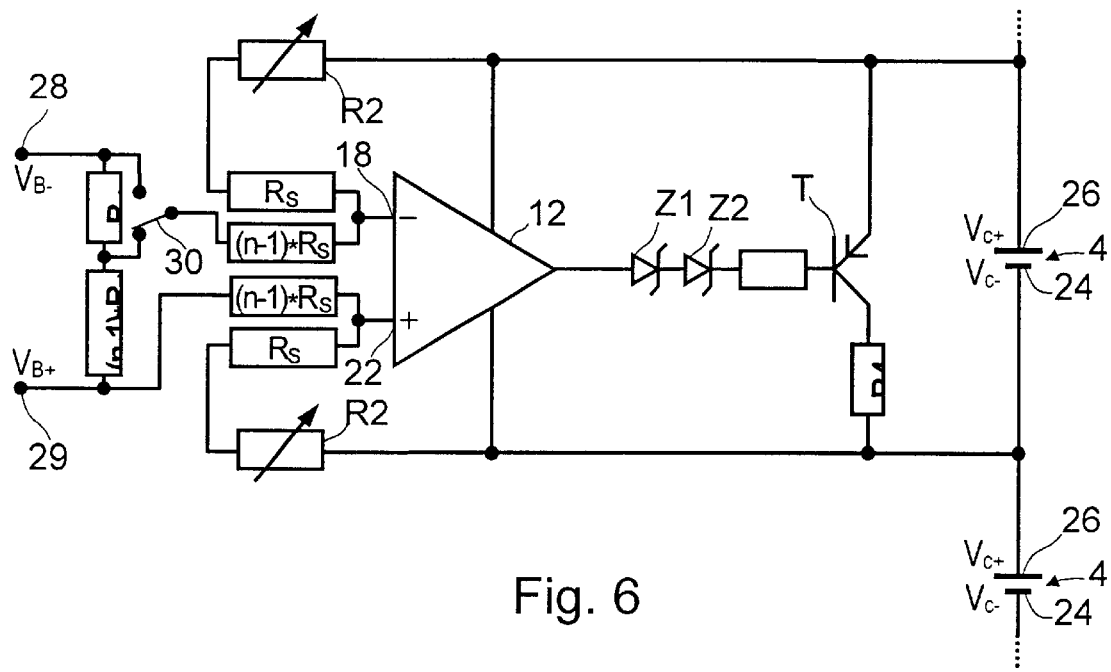
FIG. 6 shows still another modification of the cell measurement and control circuit, according to the second specific embodiment shown in FIG. 3.

According to a second aspect shown in FIG. 6, each circuit in the cell is provided with a set of resistors $R_S(n-1)*R_S$, which is adapted for a battery of n–1 cells. Before cell failure, this resistor set is connected through a switch 30 to the junction of two series-connected resistors Rd and $(n-1)*Rd$ that comprise a resistor divider bridge, connected to terminals 28, 29 of the battery so as to achieve a voltage equal to $(n-1)/n$ of the voltage $(V_{B+}-V_{B-})$ provided by the battery. After cell failure, switch 30 is toggled so as to apply the entire voltage provided by the battery, across both resistors $(n-1)*Rd$.

Figure 4:
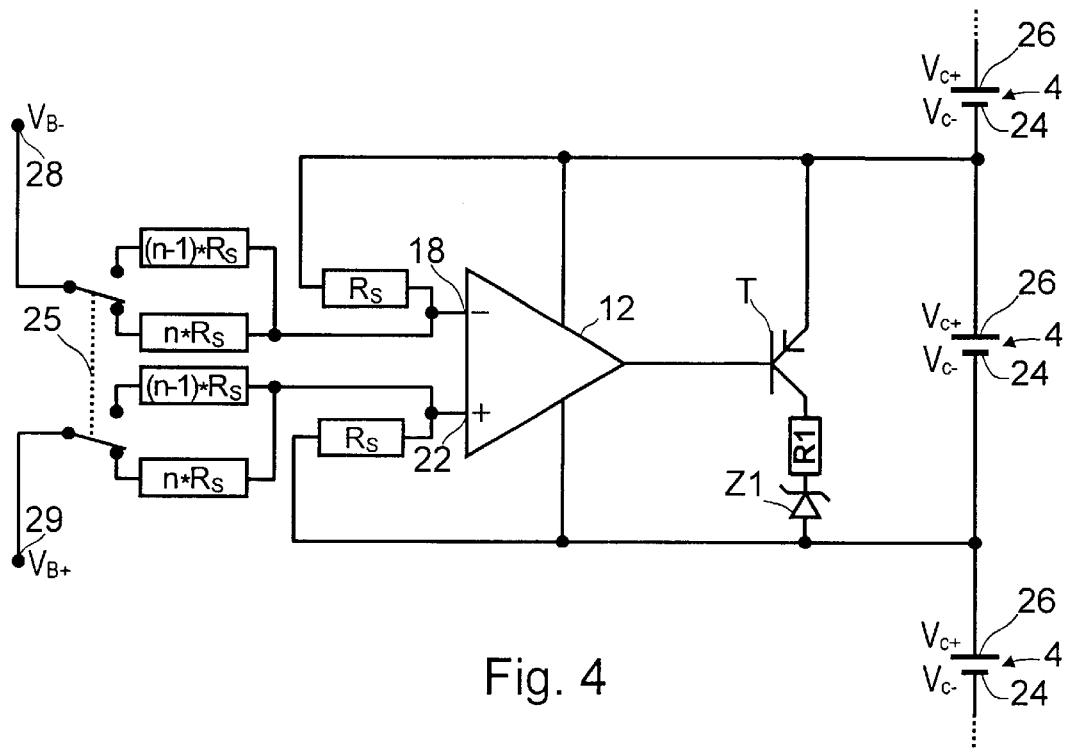
FIG. 4 shows a modification of the measurement and control circuit in one cell, according to the second more specific embodiment shown in FIG. 3.

With respect to the first aspect shown in FIGS. 4 and 5, this aspect uses more energy due to the presence of the divider bridge, but requires less additional components.

Of course, any programmable device such as a computer or a custom-made circuit can be used for controlling cell charging and discharging according to the invention, while remaining within the scope of this invention.

What is claimed is:

1. A method for balancing the charges of a plurality of series-connected battery cells, comprising the steps of connecting a current dissipative loop across each battery cell, measuring voltage across each battery cell, determining an average voltage value of said measured voltages, comparing each of said measured voltages to said average voltage value, and for each battery cell, adjusting said measured voltage to said average voltage value so as to equalize the changes of all battery cells.

2. The method according to claim 1, further comprising closing the dissipative loop connected to each of said battery cells if the voltage measured across the battery cell is greater than said average voltage value, and opening the dissipative loop if the voltage measured across said battery cell is lower than said average voltage value.

3. A device for balancing the respective charge currents of a plurality of series-connected battery cells, comprising first means for measuring individual voltages of said battery cells, second means for determining an average voltage of all of said series-connected battery cells, and a control unit for triggering an equalization of said measured voltages with said determined average voltage.

4. A device for balancing the respective charge currents of a plurality of series-connected battery cells, comprising first means for measuring individual voltages of said battery cells, second means for determining an average voltage of all of said series-connected battery cells, a control unit for triggering an equalization of said measured voltages with said determined average voltage, each of said battery cells comprising a current dissipative loop connected to said control unit, and said control unit comprising means for opening the dissipative loop associated with a respective battery cell if the individual voltage of the respective battery cell is lower than said average voltage, and for closing the dissipative loop if the individual voltage of the respective battery cell is greater than said average voltage.

5. A device for balancing the respective charge currents of a plurality of series-connected battery cells, comprising first means for measuring individual voltages of said battery cells, second means for determining an average voltage of all of said series-connected battery cells, a control unit for triggering an equalization of said measured voltages with said determined average voltage, and for each said battery cell, a comparator, a first resistor having a first terminal at a first voltage connected to a positive terminal of said comparator via a second resistor, and a second terminal at a second voltage connected to a negative terminal of said comparator via a third resistor, each of said positive and negative terminals of said comparator being additionally connected to a negative and a positive terminal of said cell respectively, via a fourth and a fifth resistor, respectively, and an output of said comparator being connected to a dissipation resistor, whereby a difference between said first voltage and said second voltage corresponds to said average voltage value.

6. The device according to claim 5, wherein the current dissipative loop of each said battery cell is controlled to be closed when the following condition is fulfilled:

$$V_{c+}+V_{r-}>V_{r+}+V_{c-},$$

wherein $V_{c-}$ and $V_{c+}$ being respective electric voltages of said negative and positive cell terminals.

7. A device for balancing the respective charge currents of a plurality of series-connected battery cells, comprising first means for measuring individual voltages of said battery cells, second means for determining an average voltage of all of said series-connected battery cells, a control unit for triggering an equalization of said measured voltages with said determined average voltage, and for each said battery cell a comparator having a positive and a negative input terminal, each of said terminals being connected to a first resistor and a second resistor, the second resistors being connected to battery terminals, respectively, the first resistors being connected respective to a positive and a negative terminal of said battery cell, and an output of said comparator being connected to one of said battery cell terminals via a dissipation resistor.

8. The device according to claim 7, wherein the second resistors have a resistance which equals n times a resistance of said first resistors with n being a number of battery cells connected in series, and said device further comprising a respective third resistor in parallel to each second resistor, said respective third resistor having a resistance n−1 times the resistance of the first resistor, and switching means for connecting either said second resistors or said third resistors across the battery terminals, respectively, depending on whether all of said battery cells are operating, or whether one of said battery cells is faulty.

9. The device according to claim 7, wherein the second resistors have a resistance equal to n−1 times the resistance of the first resistors with n being the number of battery cells connected in series and said device further comprising means for generating a voltage equal to (n−1)/n times the voltage across the battery terminals, and switching means for applying to the second resistors either the voltage across the battery terminals in case of failure of one of said cells in the battery, or the voltage supplied from the voltage generation means.

10. The device according to claim 4, further comprising for each of said battery cells, at least one Zener diode which is series-connected within said current dissipative loop so as to avoid discharging of each said cell when its voltage decreases below a given threshold.

11. The device according to claim 5, further comprising for each of said battery cells, a transistor having a base terminal connected to the output of the comparator, and an emitter and a collector terminal connected respectively across the terminals of said cell, a dissipating resistor being provided in series within the current dissipative loop comprising a collector-emitter junction of said transistor T.

12. The device according to claim 11, further comprising for each battery cell, at least one Zener diode connected in series between the output of said comparator and the base terminal of said transistor for increasing a threshold voltage at which the collector-emitter junction of transistor is turned on, and therefore, for avoiding discharging of said cell when the voltage across its terminals decreases below a given threshold.

* * * * *